July 15, 1952 W. GROEN 2,603,256
DUAL TABLE AUTOMATIC SHAPER
Filed April 13, 1949 6 Sheets-Sheet 3

INVENTOR:
WILLEM GROEN
BY
ATT'YS

*INVENTOR:*
WILLEM GROEN

July 15, 1952          W. GROEN          2,603,256

DUAL TABLE AUTOMATIC SHAPER

Filed April 13, 1949                                6 Sheets—Sheet 6

INVENTOR:
WILLEM GROEN
BY
Rummler, Rummler & Snow
ATT'YS

Patented July 15, 1952

2,603,256

UNITED STATES PATENT OFFICE 2,603,256

DUAL TABLE AUTOMATIC SHAPER

Willem Groen, Chicago, Ill., assignor to Onsrud Machine Works, Inc., Chicago, Ill., a corporation of Illinois Application April 13, 1949, Serial No. 87,253

22 Claims. (Cl. 144—139)

1

This invention relates to automatic shaping machines and particularly dual table machines for shaping small parts according to a predetermined pattern and wherein one table is in automatic shaping operation while the other table is being unloaded and reloaded by the operator.

The main objects of this invention are to provide an improved dual table automatic shaper; to provide an improved shaper construction for accurate high speed production-shaping of small parts; to provide such a device in which all mechanical operation or movement of the machine components is wholly automatic; to provide such a device wherein the work clamping, cutter movement and table drive operations may be accurately timed and controlled to afford a maximum of safety for the operator; and to provide an automatic shaper that may be safely operated by non-skilled labor.

Other objects are to provide a high speed production shaper having improved control for the cutter movement between dual operating tables; to provide an improved means for cushioning the engagement of the cutter with the work in high speed shaper operation; to provide a shaper having improved means to shift the cutter from one work table to another; to provide a dual table shaper having an improved work table drive and speed control; to provide a shaper having an improved arrangement for adjusting the operating height of the work clamps and the cutter in relation to the work and the pattern; and to provide an improved dual table shaper construction of simplified design which is more convenient for the operator, requires a minimum of space and permits substantially continuous production.

A specific embodiment of this invention is shown in the accompanying drawings in which:

Fig. 7 is a similar view, taken on line 7—7 of

2

Fig. 3, to show the cutter arm operating means.

In the form shown in the drawings the improved shaper is of the radial arm type and comprises, generally, a hollow base 1, having a horizontal top plate 2 disposed at a convenient working height; a cover plate 3 mounted on the top plate and arranged to support a pair of laterally spaced work tables 4 and 5, located at its forward side; a pair of work clamps 6 and 7, arranged to hold the work on the respective tables; and a cutter arm 8, pivotally mounted to the rear of the work tables, having a free end arranged to swing from side to side to cause a rotatable cutter 9 to engage with the work carried by the work tables.

The work tables 4 and 5 are mounted on the cover plate 3 and are arranged to be rotated on vertical axes; and the cutter arm 8 is disposed above the work tables and is mounted to pivot on a vertical axis located at the rear of the base on the fore and aft centerline between the work tables. Thus the cutter arm extends radially forward and its free end, which projects beyond a horizontal line through the axes of the work tables, may swing between the table axes and over the top surface of either table.

The cutter 9 is carried on the end of a downwardly projecting spindle 10, which in turn is carried by the cutter arm 8 adjacent its free end, and is mounted for rotation on a vertical axis parallel with the axes of the tables and with the pivot axis of the cutter arm. The spindle 10 is rotated by means of a belt and pulley drive, not shown, extending lengthwise of the cutter arm and driven by a motor 11 which is mounted on a suitable bracket 12 at the rearward end of the cutter arm, the motor bracket being an integral part of the cutter arm so that the arm and the spindle drive swing together as a unit during pivotal movement of the arm.

Figure 1:
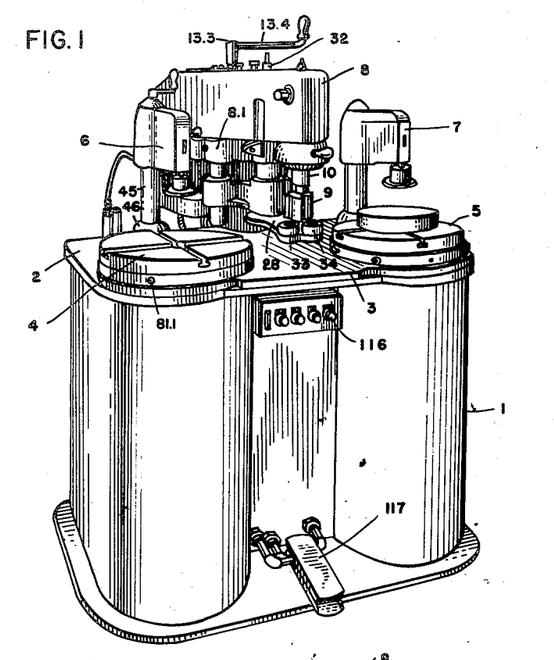
Figure 1 is a perspective view showing the improved automatic shaper from the front quarter.
Figure 2:
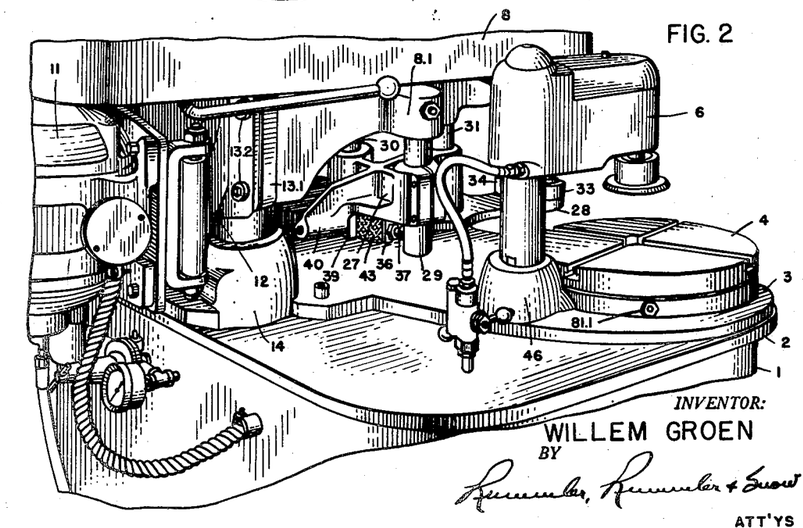
Fig. 2 is a fragmentary perspective view of the same, from the left side rear quarter, showing the location of the means for snubbing the cutter arm movement.

Details of the cutter arm are not shown for the reason that no invention is claimed herein for the arm per se and it is therefore sufficient to explain that the cutter arm comprises a rigid casting 8.1 mounted, by a hub at one end, on a rotatable steel column or post 13, disposed vertically in the rearward part of the base 1 and projecting upwardly above the top plate 3. The column 13, which provides the axis on which the cutter arm swings, extends through a suitable bearing, contained in a boss 14 formed on the rear end of the cover plate 3, and is stepped in a second bearing 15 located at the bottom of the housing 1. The column 13 is bodily rotated to swing the cutter arm, as will be hereafter described, and the cutter arm is frictionally secured on the column by means of its split hub 13.1 which is drawn together by clamping bolts 13.2 as shown in Fig. 2. Also the arm is arranged for vertical adjustment on the column 13 by means of a screw 13.3 which threads vertically into the top of the column and from which the arm hub is hung, such adjustment being made by means of a crank 13.4 after the clamping bolts 13.2 have been loosened.

Figures 3, 4:
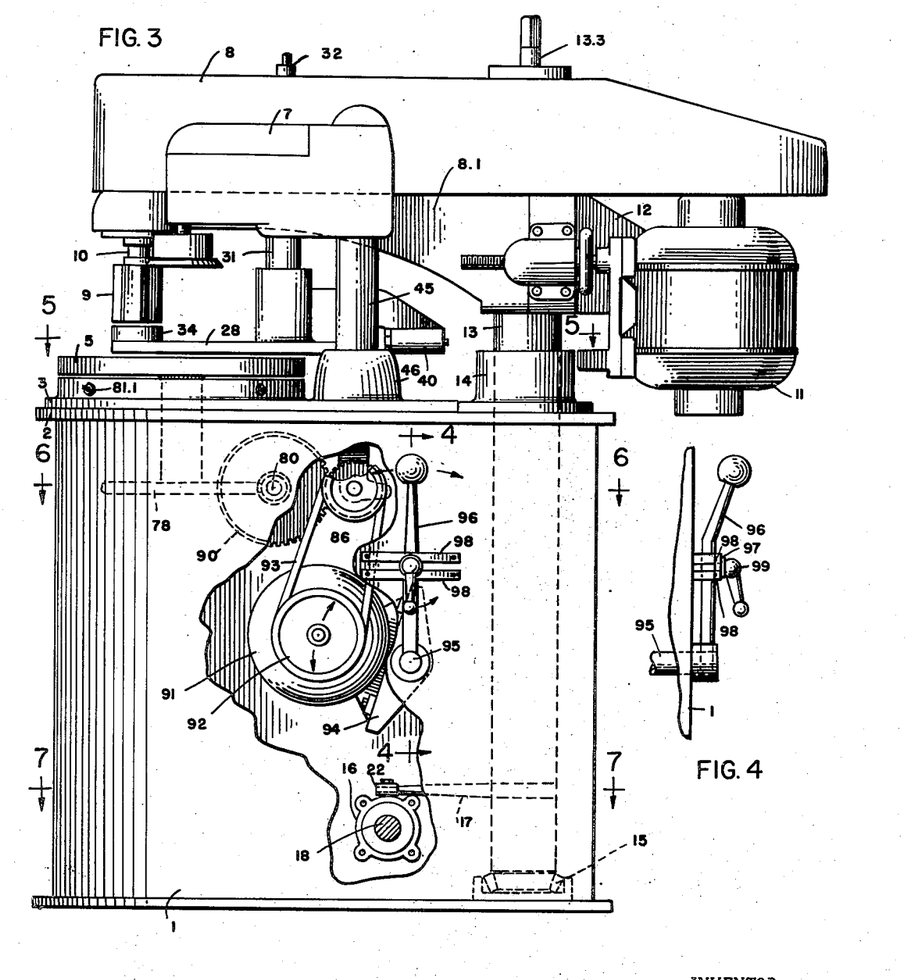
Fig. 3 is a right hand side elevation of the same with a part of the base side wall broken away to show the work table means drive and the cutter arm actuating means.
Fig. 4 is a fragmentary detail view, as taken on line 4—4 of Fig. 3, showing the work table drive speed control lever arrangement.
Figure 7:
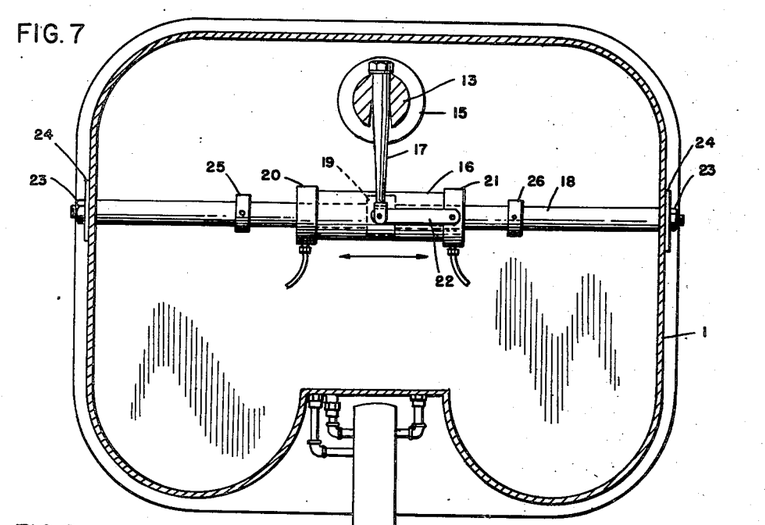
Figure 8:
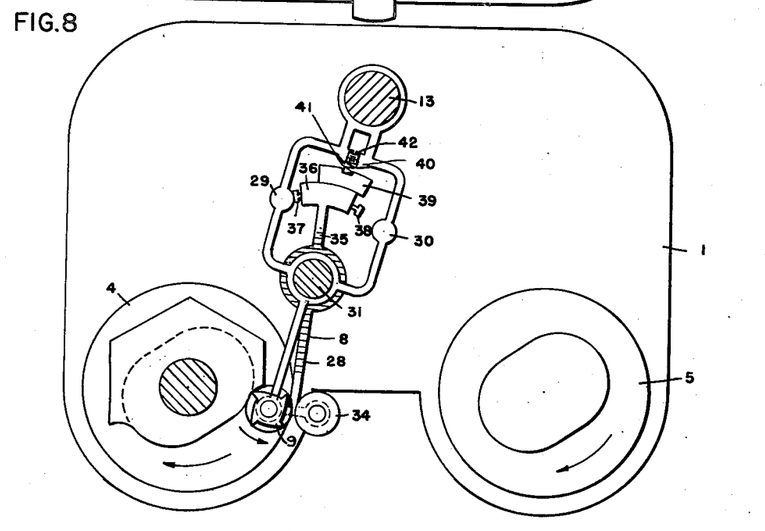
Fig. 8 is a schematic plan view illustrating the principle of operation of the cutter arm snubbing means, the view being similar to Fig. 5 with respect to the elements shown.

Referring particularly to Figs. 3 and 7, rotation of the column 13, to swing the cutter arm 8 from side to side between the work tables 4 and 5, is accomplished by means of a double acting air cylinder 16, mounted horizontally in the bottom portion of the base 1 and connected to a crank arm 17 which extends radially from the column 13.

In the form shown the air cylinder 16 comprises a hollow cylindrical body slidably mounted on a fixed piston rod or reactance means 18 which extends axially through the air cylinder and carries a stationary piston 19 adapted to slidably fit within the cylinder body. The cylinder body is provided with end caps 20 and 21, having central glands, not shown, through which the piston rod 18 extends and the cylinder body, as a whole, shifts back and forth on the piston rod, along a path at right angles to the column axis, as air under pressure is supplied to the cylinder on one side or the other of the fixed piston 19. The column crank arm 17 is connected to the shiftable cylinder 16 by means of a link 22, which has one end pivotally connected to the end cap 21 and the other end pivotally connected to the end of the crank arm. Thus, as the cylinder 16 shifts from side to side on the piston rod 18, a turning moment is applied to the arm 17 and the column 13 is accordingly turned or rotated on its vertical axis.

The piston rod 18 extends from side to side of the base 1 and is rigidly mounted by its ends, independently of the column 13, on the base side walls, as shown in Fig. 7. Preferably the piston rod 18 is reduced at its ends, to provide shoulders which may bear against the inside surface of the base sidewalls, and the reduced ends extend through the sidewalls where they are threaded to receive securing nuts 23. If desired the base sidewalls may be reinforced, at the points where the piston rod 18 is mounted, by means of plates 24 welded, or otherwise suitably secured, since the reactance of the force applied to the crank arm must be carried by the base structure.

As shown the crank arm 17 is rigidly mounted in the column 13 by means of a drive fit of one end of the arm in a transverse bore through the column, so that the free end of the arm projects as a cantilever, and the unrestrained body of the arm is tapered toward the free end thereof where the pivot connection is made to the link 22. The arm 17 is made of a tough resilient material, such as hardened chrome vanadium steel, and the taper is formed so that the arm will yield somewhat against the immediate turning force applied through actuation of the air cylinder 16. Thus as the turning force is applied to the arm 17 it is more or less gradually transmitted to the column 13 and the inertia of the column, and the cutter arm which the column carries, is overcome in such a manner that shock load on the parts being moved is obviated. Also the swinging action of the cutter arm is smoother and more uniform with the result that fast action is obtained in spite of the mass that must be moved.

In order to provide against overriding of the cutter arm, when it is operated without work on the work tables to limit its swinging movement, a pair of limit stops 25 and 26 are provided on the piston rod 18. These stops are disposed one on each side of the cylinder 16 and are spaced a sufficient distance from the respective ends of the cylinder to allow the desired maximum extent of travel of the cutter arm, in either direction between the axes of the work tables. The limit stops 25 and 26 may be in the form of collars slidable on the piston rod 18 and secured at the desired location by means of set screws in the well known manner.

In the operation of automatic radial arm shapers the engagement of the cutter with the work is regulated by means of a pattern, on which the work is mounted, and a coacting guide means which is aligned with the cutter, the pattern determining the depth of the cut or the extent to which the cutter moves into the work. In the present device the cutter is moved toward and into the work, which is turned on a fixed axis, and is urged toward the work, during the entire shaping operation, by means of the air cylinder 16 which swings the cutter arm. Thus the guide means travels with the cutter arm.

It is desirable, however, to provide a means for cushioning the engagement of the cutter with the work, so as to prevent shock on the cutter spindle, and to absorb the inertia of the cutter arm before the cutter engages the work. This I have accomplished by providing a guide means which will engage the pattern before the cutter engages the work and which will at the same time actuate a braking means to absorb the force of the cutter arm during the last part of its swinging stroke as the cutter is moved into the work.

The improved guide means and braking construction is shown in Figs. 1, 2, 5 and 8 and, as shown, comprises a bracket 27, mounted on and below the cutter arm 8, and a guide arm 28 pivotally mounted below the bracket 27. The guide arm 28 extends forwardly from the bracket, generally parallel with the cutter arm, and carries the pattern engaging guide means at its forward end. The bracket 27 is mounted on a pair of laterally spaced posts 29 and 30, which are rigidly secured to the cutter arm casting 8.1 and which project vertically downward therefrom, and a shaft 31 which extends vertically through the cutter arm casting and projects downwardly therefrom at a central position forward of the posts 29 and 30. The shaft 31 is vertically slidable in the cutter arm casting and is hung from an adjusting screw 32, in a manner not shown, so that it may be raised or lowered in the cutter arm in substantially the same way that the cutter arm hub is raised or lowered on the main supporting column 13.

The bracket 27 is slidable on the vertical posts 29 and 30 and its hubs, through which the posts extend, are split, as shown in Fig. 3, and clamped to the posts by means of screws or bolts which extend across the split portions in the usual manner.

Figure 5:
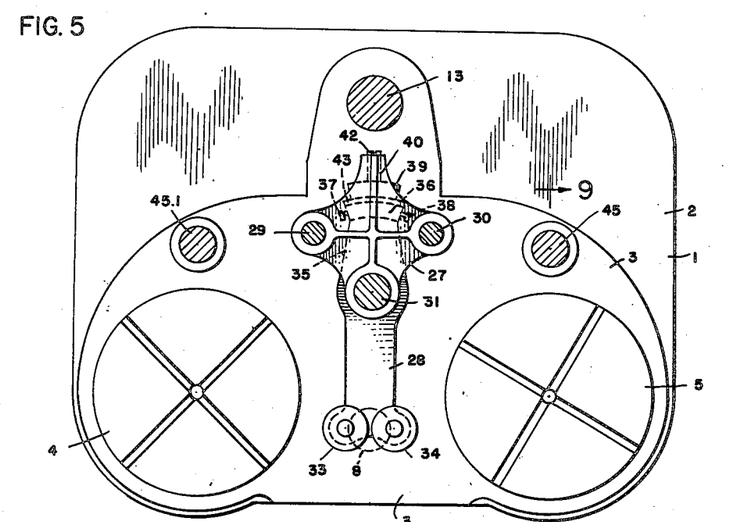
Fig. 5 is a top plan view of the shaper base, with parts in section, as taken on line 5—5 of Fig. 3.

The guide arm 28 is pivotally mounted on and wholly supported by the shaft 31, directly below the bracket 27, and is swingable laterally relative to the bracket and the cutter arm; and the guide means, which engage the patterns carried on the work tables 4 and 5, are disposed at the forward end of the guide arm, below the cutter 9, with their centers located at the same distance from the axis of the shaft 31 as the axis of the cutter. In the form shown the guide means comprise a pair of rollers 33 and 34 spaced an equal distance laterally on either side of the longitudinal centerline of the guide arm 28 and these rollers are freely journaled on vertical stub shafts, mounted on the end of the guide arm, so that they may turn upon engagement with a respective pattern.

In order to limit the pivotal or swinging movement of the guide arm 28, on the shaft 31 and relative to the cutter arm 8, I provide a rearward extension 35 on the guide arm which has a transversely disposed head 36 located at substantially the same distance, rearwardly, from the axis of the shaft 31, as the posts 29 and 30; and at each end of the head 36 I provide an adjustable stop screw 37 and 38 each of which has its head end disposed to engage a respective one of the posts 29 and 30. Thus as either of the guide rollers engages a pattern, as the cutter arm swings toward the respective work table, the guide arm is caused to swing or shift in the opposite direction on the shaft 31 until the respective stop screw engages the adjacent one of the posts. This limits the movement of the guide arm relative to the cutter arm and, since the guide arm is carried by the cutter arm, permits the guide rollers to limit the movement of the cutter arm and the cutter toward the work.

Normally the pattern engaging surface of the respective guide means, or roller, is vertically aligned with the work engaging periphery of the cutter 9 when the cutter is operating on the work, the pattern in this case being of the same size as the finished work; and the adjustable stop screws 37 and 38 are provided in order that compensation for wear on the cutter may be made. Ordinarily the guide rollers will be of the same outside diameter as the cutter but as the cutter wears and is resharpened its diameter will decrease, hence the position of the guide roller relative to the axis of the cutter during the cutting operation must be changed or adjusted because the guide roller determines the depth or extent that the cutter enters the work.

The braking of the cutter arm movement and the cushioning of the cutter as it engages the work are accomplished by snubbing the swinging movement of the guide arm 28—35, relative to the cutter arm 8, after the guide means has engaged the pattern. In the form shown, the brake or snubber comprises a spring actuated shoe 39, mounted on a rearwardly and downwardly extending arm 40 on the bracket 27, the shoe 39 being disposed to face and bear against the rearward face of the head 36 on the rear portion 35 of the guide arm 28.

The shoe 39 is normally urged against the head 36 by means of a compression spring 41, housed in a bore in the arm 40, and, through the tension or pressure exerted by the spring 41, the shoe 39 is caused to bear continuously on the head 36 so as to provide a friction braking action against movement of the head 36 relative to the shoe. The pressure of the spring 41, urging the shoe against the head 36, may be adjusted by means of a threaded plug 42 to vary the braking force applied on the head 36. This construction is clearly indicated in the schematic view shown in Fig. 8, which is included to aid in visualizing the operative relation of the cutter arm and guide arm combination.

As shown in Figs. 2 and 5, the rearward face of the head 36 is covered with a piece of friction material 43, which is similar to a composition brake lining material. This is done in order to provide greater friction than would be had by simple metal-to-metal contact and to minimize wear on the rear face surface of the head 36.

Figure 9:
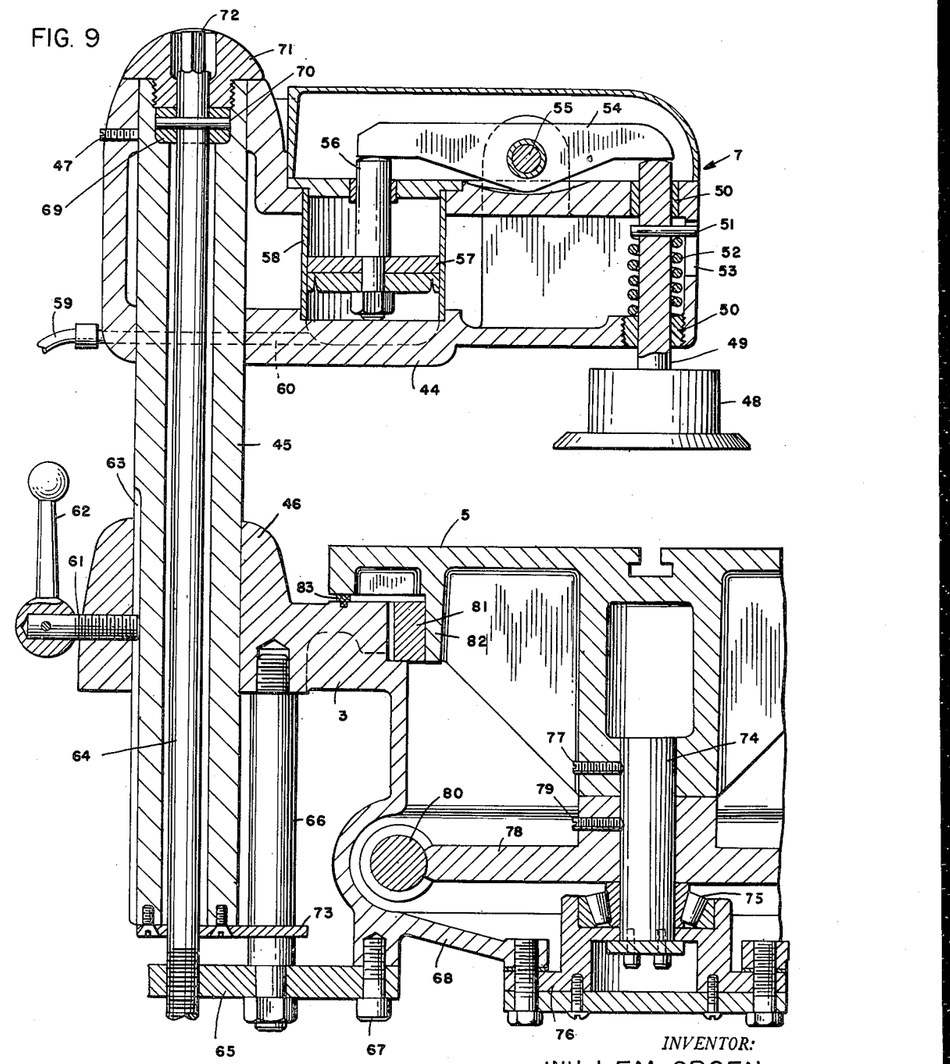
Fig. 9 is a vertical sectional view of the work table and work clamping means, as taken on the line 9—9 of Fig. 5, a part of the work table being broken away.

The work to be shaped on the work tables 4 and 5 is held in position on the work tables by means of the pneumatic clamps 6 and 7, each of which is arranged with a clamping head disposed directly above the respective work table in axial alinement therewith. The construction of these pneumatic clamps is illustrated in Fig. 9 and, as shown, each clamp comprises a hollow body 44, mounted on the upper end of a vertical shaft 45 slidably disposed in a boss 46 which is formed as an integral part of the cover plate 3. The body 44 is arranged to fit over the upper end of the shaft 45 and is clamped thereon by means of one or more set screws 47 which extend through the rear end wall of the body and into engagement with the shaft.

The clamping head 48 is mounted on the bottom end of a carrier rod 49 which extends vertically upward into the forward end of the clamp body 44. The rod 49 is slidably disposed in suitable vertically spaced bushings 50 and is retained in the body 44 by means of a dowel pin 51 which extends through the rod 49 and rests upon the upper coil of a helical spring 52, which in turn is seated on the bottom wall of the body 44. The head 48 is rotatably mounted on the end of the rod 49 and the rod 49 is prevented from turning by allowing one end of the dowel pin 51 to extend through a vertical slot 53 formed in the forward end wall of the body 44.

The clamping head 48 operates with a reciprocating or up-and-down movement and is normally held in a raised or elevated position by means of the spring 52 which bears upwardly against the dowel pin 51. Lowering of the clamping head 48, to cause it to engage against the work, is accomplished by means of a lever 54 which is journaled on a cross pin 55 on the upper side of the body 44. The lever 54 extends on either side of the cross pin 55 with one end bearing against the upper end of the clamping head carrier rod 49 and the other end resting upon the upper end of a piston rod 56 which in turn is actuated by a piston 57 contained in an air cylinder 58, the air cylinder 58 being fixedly mounted in a vertical position within the body 44.

Air for actuating the piston 57 is supplied through an air connection 59 which leads, by means of a passage 60, from the rear end of the housing 44, through the housing body at one side of the shaft 45, to the lower end of the air cylinder 58. Normally the piston 57 is in a lowered position in the air cylinder 58 and when air is supplied through the passage 60, the piston is raised in the air cylinder, thereby causing the lever 54 to rock and press downwardly on the clamping head carrier rod 49, thereby pressing the rod 49 downwardly, against the action of the spring 52, to cause the clamping head 48 to engage the work.

When the air pressure to the air cylinder 58 is released, the spring 52 releases the clamping head 48 from the work by causing the rod 49 to move upwardly, which action also rocks the lever 54 in the opposite direction and causes the piston 57 to return to its lowered position.

As before-mentioned, the shaft 45, on which the work clamp is mounted, is vertically slidable in the boss 46, the purpose of this arrangement being to permit vertical adjustment of the position of the work clamp relative to the top surface of the work table. When the desired height or position of the clamp above the work table is obtained, the shaft 45 is locked by means of a clamping screw 61, actuated by a handle or lever 62. The clamping screw 61 extends through the side wall of the boss 46 and engages in a keyway 63 formed in the adjacent surface of the shaft 45.

In the arrangement shown in Fig. 9, vertical adjustment of the shaft 45, which supports the work clamp, is obtained by means of a long screw 64 which extends from the top end of the shaft, through a central bore in the same, into a fixed plate 65 which is supported at the bottom end of the shaft by a guide rod 66 threaded into the bottom side of the boss 46 and extending downwardly therefrom.

The screw 64 is threaded through a tapped hole in plate 65 and the plate, which thus acts as a fixed nut, is held against rotation by means of a stud 67 which extends through an opening in a margin of the plate 65 and into the wall of a housing 68 formed integrally on the cover plate 3 and arranged to enclose a respective work table supporting and driving mechanism.

The upper end of the screw 64 is provided with a fixed collar 69 which seats in a counterbore 70, formed in the upper end of the shaft 45, and an upward thrust support for the collar 69 is provided by a cap member 71 which is screwed into a suitably threaded portion of the counterbore 70. As shown, the cap 71 is provided with a central opening through which the upper end 72 of the screw 64 extends and the upper end of the screw is squared to receive a crank, not shown, by means of which the screw is turned.

Thus, when the clamping screw 61 is released, the shaft 45 will hang on the collar 69 of the screw 64 and by turning the screw 64 it will be caused to move up and down relative to the fixed plate or nut 65, thereby effecting vertical adjustment of the shaft 45.

As shown, the shaft 45 is prevented from turning, during such vertical adjustment, by means of a guide arm 73 which is fastened on the bottom end of the shaft and arranged to embrace the guide rod 66. Thus even if the clamping screw 61 should be withdrawn completely from the keyway 63 in the shaft 45, the shaft 45 will nevertheless be held against any rotational movement which might cause lateral displacement of the clamping head 48.

Fig. 9 also illustrates the manner in which the work tables are mounted in the cover plate 3. This view is taken on the line 9—9 of Fig. 5 and shows the righthand work table 5. As shown, the work table is mounted on a vertically disposed shaft 74 which has its lower end journaled in a step bearing 75 which in turn is mounted in a bearing support 76 secured to the bottom end of the work table housing 68. The work table is suitably keyed to the upper end of the shaft 74, as by means of set screw 77, and immediately below the work table hub is a worm gear 78, which is also suitably keyed to the shaft 74 by means of a set screw 79. The gear 78 is driven by a worm 80 and rotation is thus imparted to the work table.

As shown, the work table is centered and laterally stabilized by an annular bearing means 81, which is made up of several segments and extends around the inner periphery of the opening in the cover plate 3, in which the work table is set, and which engages an annular depending collar or flange 82 formed integrally on the bottom side of the work table, the flange 82 extending downwardly into the opening in the cover plate 3. Felt pads, not shown, are disposed between the adjoining ends of the segments, which make up the bearing ring 81 in order to provide means for lubrication; and the several segments are arranged to be radially adjusted, as by means of the screws 81.1 shown in Figs. 1, 2 and 3.

A dust and dirt seal is also provided by an annular gasket 83, which is set into a groove in the top face of the cover plate 3, directly below the margin of the work table, which gasket bears upwardly against the work table and serves to seal the edge opening against the passage of chips or dust.

Figure 6:
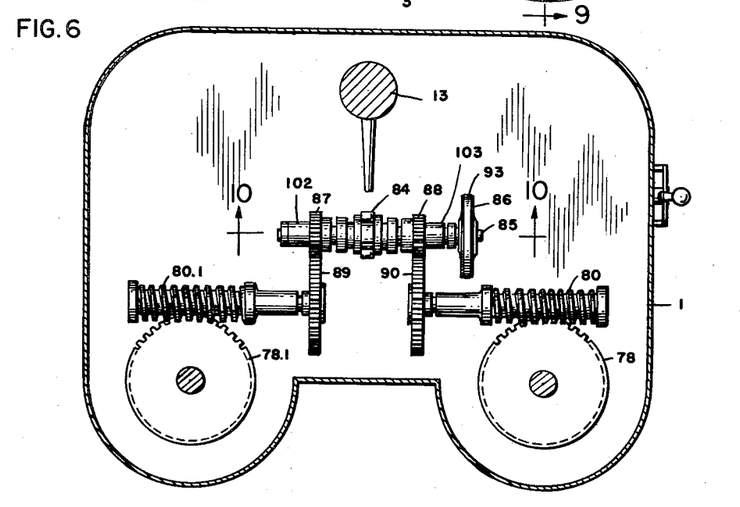
Fig. 6 is a horizontal section view, taken on line 6—6 of Fig. 3, to show the work table drive transmission means.

The means for driving the worms which impart rotation to the work tables is shown in Figs. 3 and 6 and comprises a double-acting clutch 84 mounted on a shaft 85 which in turn is driven by a pulley 86. The clutch 84 is arranged to drive one or the other of a pair of pinions 87 and 88, which in turn are mounted on the shaft 85 on opposite sides of the clutch 84 and are meshed with gears 89 and 90 respectively. The pinions 87 and 88, are freely rotatable relative to the shaft 85 and are driven solely through the clutch 84; and the gears 89 and 90 are respectively mounted on the ends of the worms 80.1 and 80 as shown in Fig. 6.

Power for driving the pulley 86 is supplied by an electric motor 91 (see Fig. 3) which drives a variable speed pulley 92 which in turn is connected to the pulley 86 by a V-belt 93. The motor 91 is mounted on a tilting bracket 94 which in turn is fixedly supported on a cross shaft 95 suitably supported horizontally in the base 1.

The purpose of the tilting brace or motor support 94 is to vary the distance between the motor pulley 92 and the pulley 86, which drives the clutch mechanism 84, and to thereby cause variation of the effective diameter of the variable speed pulley 92, the pulley 92 being of the type in which both of the side disks are axially adjustable relative to the other and are spring-loaded toward each other so that by varying the tension on the belt, the movable halves of the pulley are caused to shift along the pulley axis and change the effective pulley diameter. This type of variable speed pulley is well known and is available on the open market.

Tilting of the motor base 94, on the axis of the shaft 95, is accomplished by turning the shaft 95 by means of a lever 96 which is mounted on the end of the shaft 95 on the outside of the base 1, as shown in Fig. 4. The lever 96 extends through a sliding block 97 arranged to slide horizontally between a pair of guide bars 98 which are mounted on the outside of the side wall of the base 1 and which are spaced therefrom to permit swinging movement of the lever 96. A clamping lever 99, threaded onto an outwardly projecting stud integral on the guide bar 97, is provided to clamp the lever 96 to the guide means 98 at whatever position the lever 96 might be set. Thus by shifting the lever 96 one way or the other, the tension on the belt 93 can be varied to change the effective diameter of the variable speed pulley 92 and hence vary the speed at which the pulley 86 and the work tables are driven.

Figure 10:
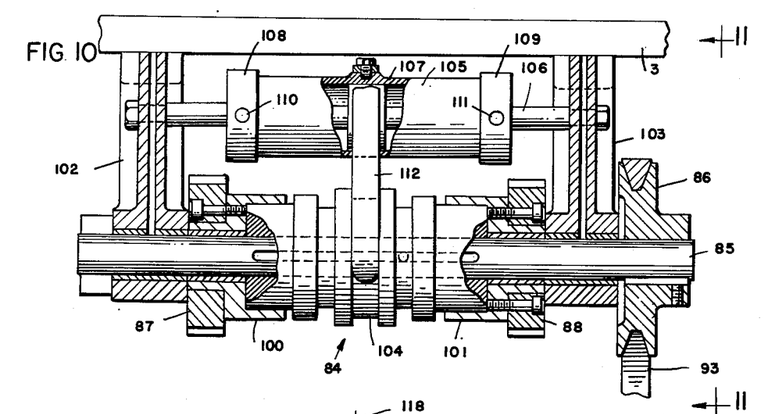
Fig. 10 is a partially sectioned view, as taken on line 10—10 of Fig. 6, showing the work table drive transmission and the shifting means therefor.
Figures 11, 12:
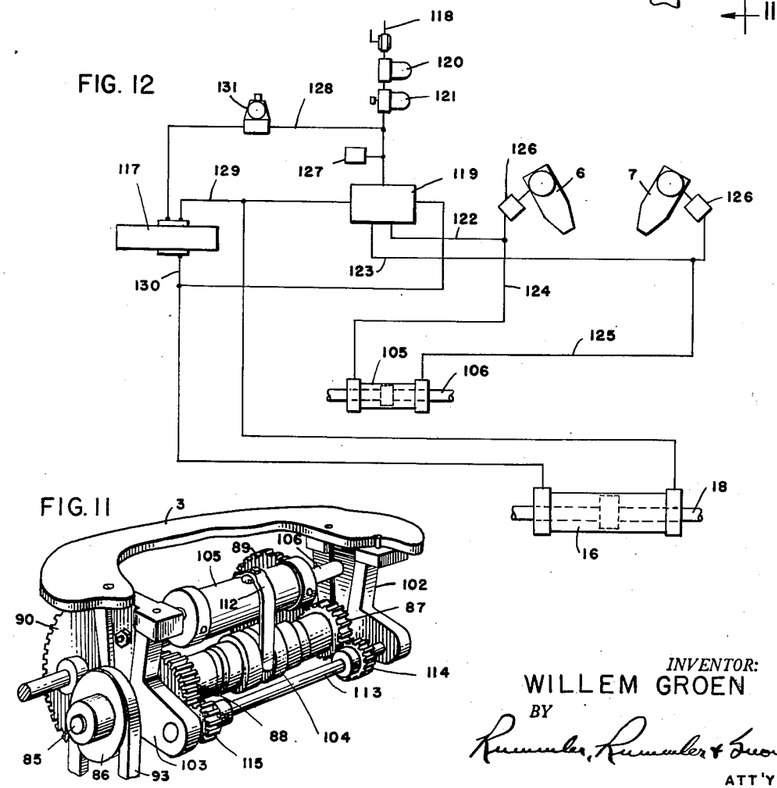
Fig. 11 is a perspective view showing the work table drive transmission from the rear side thereof, as viewed from the line 11—11 of Fig. 10.
Fig. 12 is a diagram showing the air connections for pneumatic operation and control of the machine.

Details of the double-acting clutch and the means for shifting the same to cause operation of one table or the other are shown in Figs. 10 and 11, the view of Fig. 10 being taken on the line 10—10 of Fig. 6. The double-acting clutch shown is a multidisc friction clutch of a well-known construction in which the driving means are keyed to the driving shaft 85 and in which an axially shiftable collar at the center of the clutch is arranged to cause connection of the driving means with one or the other of a pair of oppositely disposed end members or driving cups 100 and 101 to which the driven gears 87 and 88 are fastened, the driving cups being normally freely rotatable on the clutch driving shaft 85.

As shown in Figs. 10 and 11, the shaft 85 is journaled in and supported from a pair of hanger brackets 102 and 103, which brackets are in turn supported from the bottom side of the cover plate 3; and the clutch mechanism together with the driven gears 87 and 88 are mounted on the shaft 85 between the hanger brackets. These hanger brackets also support the shifting means by which the shiftable collar 104 of the clutch is moved axially to cause clutching engagement with one or the other of the driving cups 100 and 101.

As shown, the clutch shifting means comprises an air cylinder 105 mounted on a piston rod 106 which extends between the brackets 102 and 103 and is fixed thereto. A piston 107 is mounted fast on the piston rod 106 midway between its ends and is formed to fit the cylinder 105. The cylinder is provided with end caps 108 and 109, which have suitable glands, not shown, through which the piston rod 106 extends. The air cylinder 105 is thus bodily shiftable in either direction along the piston rod 106 and such shifting movement is accomplished by means of compressed air which is introduced into one side or the other of the air cylinder through suitable air connections in the end caps, as at 110 and 111.

The connection between the clutch collar 104 and the shiftable air cylinder 105 is obtained by means of a yoke 112 which is mounted fast to the air cylinder body and which extends downwardly to embrace the clutch collar 104 in a suitable annular groove provided therein. Thus as the air cylinder 105 is shifted to one side or the other the clutch mechanism is likewise actuated to cause driving connection with one or the other of the driven gears 87 and 88.

Preferably the clutch mechanism is also arranged to provide for rotation of both work tables simultaneously, regardless of the position of the clutch parts, and this is accomplished by means of a jack shaft 113, disposed parallel with the axis of the clutch and journaled in the brackets 102—103. The jack shaft is provided with a pair of axially shiftable pinions 114 and 115, adapted to be meshed with the gears 87 and 88, respectively, and these pinions are arranged to be keyed to the jack shaft, in a suitable manner, and fixed in a set position. Thus, by meshing the pinions 114 and 115 with the gears 87 and 88, both of the gears will be driven regardless of the side to which the clutch collar 104 may be shifted by the air cylinder 105. Otherwise, when alternate drive of the work tables is desired, disconnection of one or both of the pinions 114 and 115 from the respective gears will leave the gears subject to alternate actuation by the clutch mechanism.

In the operation of my improved shaper the electric motors 11 and 91 which drive the cutter and the work tables, respectively, are controlled by magnetic starters, not shown, which in turn are actuated by start and stop push buttons conveniently mounted in a panel 116 mounted at the front side of the machine; and the pneumatic devices which control the operation of the cutter arm 8, the table driving clutch 84 and the work clamps 6 and 7 are governed by a foot valve 117, located at the bottom of the base on the front side thereof, which determines the distribution of the compressed air by which the pneumatic devices are actuated. Thus the operator starts the machine operation by first starting the cutter and table drive motors through the push button station 116 and thereafter controls the operation solely through the foot valve 117.

The work is machined or shaped on one of the work tables while the other table is idle and is being unloaded and reloaded. Thus the operator, having first fixed suitable patterns on the work tables, places a blank to be formed on the pattern of the idle work table and, by operation of the foot valve 117, causes the respective clamp to engage the work and hold it securely against the pattern. Simultaneously the clutch mechanism is actuated by means of the air cylinder 105 to shift the drive to the newly loaded table and the cutter arm 8 is actuated by the air cylinder 16 so as to move toward the newly loaded table. As the cutter arm approaches the work table the respective pattern follower or guide roller engages the pattern and the guide arm 28 is caused to pivot or swing against the braking action of the spring pressed shoe carried by the cutter arm bracket 27, thus slowing the movement of the cutter arm and cushioning the engagement of the cutter with the work.

The cutter arm air cylinder 16 acts continuously on the pivoted cutter arm column and constantly urges the cutter toward the work so that when the guide arm has swung to the extent allowed by the stop screws 37—38 the cutter has fully entered the work and the shaping operation is begun. Contact of the pattern follower or guide means 33—34 controls the position of the cutter in relation to the work and, since the cutter arm is constantly urged toward the work during the shaping cycle by means of the air cylinder 16, the finished part becomes a duplicate of the pattern contour.

During one cutting cycle the opposite work table is stopped and the respective clamp is released so that the operator can quickly remove the finished piece and reload with a blank to be shaped. Thus at the completion of each machining cycle the operator merely operates the foot valve 117 to shift the operation to the opposite table.

The several air cylinders are actuated simultaneously, however, the work clamps are quick acting devices, driven by the full air pressure, and act to clamp the work before the respective work table begins its rotation. Some time is required to swing the cutter arm 8 to cutting position and by the time that the cutter engages the work the work table is turning at its full speed so that a uniform cutting action is had. Once the foot valve 117 is operated the shaping or machining operation of the machine is completely automatic, the control and actuation of the several operating components of the machine being entirely under the influence of the air cylinders 6, 7, 16 and 105, and the operator is free to confine his attention to unloading and reloading the idle work table.

A typical arrangement of the pneumatic operating and control circuit for the machine is shown in Fig. 12. In this system compressed air at a predetermined pressure is supplied from a suitable source, not shown, to a single supply line 118, from which the air is distributed to the air cylinders by way of suitable control valves.

Preferably the full air pressure, for example 100 pounds per square inch, is supplied to the air cylinders of the clamps 6 and 7, and to the clutch operating cylinder 105; and delivery of the air to the clamps 6 and 7, and to the opposite ends of the clutch cylinder 105, is controlled by means of a pneumatically actuated master valve 119. Thus the supply line 118, which includes an air filter 120 and a suitable air lubricator 121, leads directly to the master valve from which the air is supplied alternately to the lines 122 and 123 which lead directly to the clamps 6 and 7, respectively, and to the respective ends of the clutch cylinder 105 through the branch connections 124 and 125.

The master valve 119 is of the type which, when delivering air to one line, simultaneously bleeds the alternate line to release the pressure therein. In this manner, when air is supplied to the line 122 to actuate the left hand clamp 6 and move the cylinder 105 to the left, the line 123 is opened to atmosphere to release the pressure from the right hand clamp 7 and the right side of the cylinder 105. It is preferable, however, that the air pressure be released from the clamps at a retarded rate in order to allow time for the cutter to move away from the work and for the respective work table to slow or stop rotation before the clamp is released from the work, thus assuring that the work will not be thrown from the table by engagement with the cutter blades or due to the table rotation, and for that purpose the air lead to each clamp is provided with a speed valve 126, of any well known type, which can be adjusted to release the pressure from the clamp at a predetermined rate. Also, since it is essential that maximum clamping pressure be exerted by the clamps 6 and 7 during any operation of the machine, a pressure switch 127 is connected into the air supply line to automatically open the electric circuits to the table and cutter drive motors whenever the air pressure drops below a predetermined minimum. This is a safety factor which assures that the work will be securely held whenever the cutter is engaged.

As shown, the operation of the master valve 119 and the cutter arm cylinder 16 are controlled by the foot valve 117 to which air is supplied through a branch line 128 connected to the main supply line 118. The valve 117 may be any suitable 3-way air valve having provision for bleeding the outlet line to which the air is not being supplied; and, as shown, has two outlets 129 and 130, each of which has branches leading to a respective side of the master valve 119 and the air cylinder 16. Thus upon actuation of the foot valve 117 all pneumatically operated components of the machine are caused to shift or operate simultaneously with respect to one work table and when this valve is again operated the machine components all automatically shift to operate with respect to the other work table.

The air pressure delivered by the foot valve 117 need not be at full line pressure and often it is desired to regulate the pressure actuating the cutter arm cylinder 16 in order to vary the pressure exerted on the cutter as it engages the work being shaped. For that reason a pressure regulator 131 is installed in the line 128 to the foot valve, which pressure regulator may include a gauge to indicate the actual pressure being supplied.

The main advantages of this invention reside in the fully automatic operation and control of the working components of the machine whereby the operator's attention may be confined wholly to simply loading and unloading the idle work table; and in the high speed shaping operation thus permitted which produces a finished piece substantially as fast as the operator can unload and load the idle table.

Other advantages reside in the operating arrangement of the machine whereby a maximum of safety is afforded to the operator, thus permitting operation of the device by relatively unskilled labor without danger of loss or harm to either personnel or material.

Further advantages will be seen in the adaptability of the improved mechanisms to arrangement most convenient to the operator; particularly in the disposition of the work tables and the cutter which permits a machine design allowing the operator to work safely in such close proximity to the work tables and the machine controls that he can perform all necessary movements from a single standing or sitting position.

Still other advantages derive from the ease with which the machine parts may be adjusted for various sizes of work and to maintain accuracy in the finished pieces. And still further advantages will be found in the greatly increased rate of production of highly accurate, finely finished, shaped parts that is afforded by the high speed automatic dual table operation of the device.

Although but one specific embodiment of this invention is herein shown and described it will be understood that numerous details of the construction shown may be altered or omitted without departing from the spirit of this invention as defined by the following claims.

I claim:

1. A shaper comprising a base having a pair of spaced horizontally disposed rotatable work tables mounted thereon, a cutter arm pivotally mounted on said base above said work tables and having a free end swingable between the axes of said work tables, a rotatable cutter on said arm, means to rotate said cutter, means to drive said tables, and means to shift said cutter arm alternately from one table to another, said means being adapted to resiliently urge said cutter arm toward the axis of the table to which it has been shifted.

2. A shaper comprising a base having a pair of spaced rotatable work tables mounted on vertical axes, means to drive said work tables, a cutter arm pivotally mounted on said base behind said work tables and having a forwardly extending free end swingable horizontally between said work tables, a rotatable cutter carried adjacent the free end of said cutter arm, means to rotate said cutter, and means to shift said cutter arm toward the axis of one table and then toward the axis of the other table alternately, said means being adapted to yieldably urge said cutter arm in the direction toward which it has been shifted.

3. A shaper comprising a base having a pair of spaced rotatable work tables mounted on vertical axes, means to drive said work tables, a rotatable vertical column extending upwardly from said base behind said work tables, a cutter arm mounted on said column above said work tables and having a forwardly extending free end swingable horizontally, a spindle extending downwardly from adjacent the free end of said cutter arm and adapted to carry a cutter at its lower end, means to rotate said spindle, and means to shift said cutter arm toward the axis of one table and then toward the axis of the other table alternately, said means being adapted to yieldably urge said cutter arm in the direction toward which it has been shifted.

4. A shaper comprising a base having a pair of spaced rotatable work tables mounted thereon, a cutter arm pivotally mounted on said base and arranged with a free end swingable between the axes of said work tables, a rotatable cutter mounted adjacent the free end of said arm and disposed to be engaged with work carried by said tables, means to rotate said cutter, means to shift said cutter arm alternately toward one table and then the other, and means to drive said work tables alternately according to the direction of swing of said cutter arm whereby the table toward which said cutter arm is shifted will be rotated while the other table is stopped.

5. A shaper comprising a base having a pair of spaced rotatable work tables mounted thereon, a cutter arm pivotally mounted on said base and arranged with a free end swingable between the axes of said work tables, a rotatable cutter mounted adjacent the free end of said arm and disposed to be engaged with work carried by said tables, means to rotate said cutter, means to shift said cutter arm alternately toward one table and then the other, and drive means for said work tables including clutch mechanism to connect said drive means with said tables selectively according to the direction of swing of said cutter arm, said clutch mechanism being operable upon swinging of said cutter arm to drive the table toward which said arm is moved and to disconnect the other table.

6. A shaper comprising a base having a pair of spaced rotatable work tables mounted thereon, a cutter arm pivotally mounted on said base and arranged with a free end swingable between the axes of said work tables, a rotatable cutter mounted adjacent the free end of said arm and disposed to be engaged with work carried by said tables, means to rotate said cutter, means to shift said cutter arm alternately toward one table and then the other, drive means for said work tables including clutch mechanism adapted to connect said drive means with the respective table toward which said cutter arm is shifted and to disconnect the other table, and means to actuate said clutch mechanism automatically upon shifting of said cutter arm.

7. A shaper comprising a base having a pair of spaced rotatable work tables mounted thereon, a cutter arm pivotally mounted on said base and having a free end disposed to swing between the axes of said tables in a plane normal thereto, a rotatable cutter mounted on said arm and disposed to engage work carried by said tables, means to rotate said cutter, means to drive said tables, means to shift said cutter arm alternately toward one table and then the other, and means to brake the movement of said cutter arm as it approaches the table toward which it is shifted.

8. A shaper comprising a pair of spaced rotatable work tables mounted on vertical axes and having means to drive said tables, a cutter arm pivotally mounted above said work tables and having a free end disposed to swing horizontally between the axes of said tables, a rotatable cutter mounted on said arm and disposed to project downwardly therefrom to engage work carried on said tables, means to rotate said cutter, means to shift said arm from side to side alternately to engage the cutter with work on a respective table, and means to brake the movement of said arm prior to engagement of the cutter with the work.

9. A shaper comprising a pair of spaced rotatable work tables mounted on vertical axes and having means to drive said tables, a cutter arm pivotally mounted above said work tables and having a free end disposed to swing horizontally between the axes of said tables, a rotatable cutter mounted on said arm and disposed to project downwardly therefrom to engage work carried on said tables, means to rotate said cutter, means to swing said arm from side to side alternately to engage said cutter with work on a respective table, and means to brake the swinging movement of said arm as said cutter is brought into engagement with the work, said swing means being adapted to urge said cutter arm resiliently in the direction it has been shifted and while the cutter is engaged with the work.

10. A shaper comprising a pair of spaced work tables mounted to rotate on parallel axes and having means to drive said work tables, a cutter arm pivotally mounted on an axis parallel with the axes of said tables and having a free end extending between the axes of said tables and swingable therebetween, said cutter arm having a rotatably driven cutter disposed adjacent said free end and arranged to engage work carried on said tables, means to shift said cutter arm from side to side alternately to engage the cutter with work on a respective table, a cutter guide means carried by said cutter arm and disposed to engage a pattern mounted on each of the respective work tables, said guide means being mounted for independent shifting movement relative to the cutter along a path extending transversely through the cutter axis and being adapted to engage the respective pattern in advance of engagement of the cutter with the work upon shifting movement of said cutter arm, and means to limit the shifting movement of said guide means.

11. A shaper comprising a pair of spaced work tables mounted to rotate on parallel axes and having means to drive said work tables, a cutter arm pivotally mounted on an axis parallel with the axes of said tables and having a free end extending between the axes of said tables and swingable therebetween, said cutter arm having a rotatably driven cutter disposed adjacent said free end and arranged to engage work carried on said tables, means to shift said cutter arm from side to side alternately to engage the cutter with work on a respective table, a cutter guide means carried by said cutter arm and disposed to engage a pattern mounted on each of the respective work tables, said guide means being of greater transverse width than the diameter of said cutter and being mounted for independent shifting movement relative to the cutter along a path extending transversely through the cutter axis, whereby said guide means will engage the respective pattern in advance of engagement of the cutter with the work upon shifting movement of said cutter arm, and means to limit the shifting movement of said guide means to a predetermined extent.

12. A shaper comprising a pair of spaced work tables mounted to rotate on parallel axes and having means to drive said work tables, a cutter arm pivotally mounted on an axis parallel with the axes of said tables and having a free end extending between the axes of said tables and swingable therebetween, said cutter arm having a rotatably driven cutter disposed adjacent said free end and arranged to engage work carried on said tables, means to shift said cutter arm from side to side alternately to engage the cutter with work on a respective table, a cutter guide means carried by said cutter arm and disposed to engage a pattern mounted on each of the respective work tables, said guide means being of greater transverse width than the diameter of said cutter and being mounted for independent shifting movement relative to the cutter along a path extending transversely through the cutter axis, whereby said guide means will engage the respective pattern in advance of engagement of the cutter with the work upon shifting movement of said cutter arm, brake means adapted to resist shifting movement of said guide means, and means to limit the shifting movement of said guide means to a predetermined extent.

13. A shaper comprising a pair of spaced work tables mounted to rotate on parallel axes and having means to drive said work tables, a cutter arm pivotally mounted on an axis parallel with the axes of said tables and having a free end extending between the axes of said tables and swingable therebetween, said cutter arm having a rotatably driven cutter disposed adjacent said free end and arranged to engage work carried on said tables, means to shift said cutter arm from side to side alternately to engage the cutter with work on a respective table, a laterally shiftable guide arm pivotally mounted on said cutter arm and having a free end extending across the end of said cutter, laterally spaced guide members on said guide arm each disposed to engage a respective pattern mounted on said work tables, said guide arm being adapted to engage a guide member with a respective pattern in advance of engagement of the cutter with the work upon shifting movement of the cutter arm, and means to limit the shifting movement of said guide arm as said cutter moves into the work.

14. A shaper comprising a pair of spaced work tables mounted to rotate on parallel axes and having means to drive said work tables, a cutter arm pivotally mounted on an axis parallel with the axes of said tables and having a free end extending between the axes of said tables and swingable therebetween, said cutter arm having a rotatably driven cutter disposed adjacent said free end and arranged to engage work carried on said tables, means to shift said cutter arm from side to side alternately to engage the cutter with work on a respective table, a laterally shiftable guide arm pivotally mounted on said cutter arm and having a free end extending across the end of said cutter, laterally spaced guide members on said guide arm each disposed to engage a respective pattern mounted on said work tables, said guide arm being adapted to engage a guide member with a respective pattern in advance of engagement of the cutter with the work and to shift laterally relative to the cutter as the cutter moves into the work, brake means associated with said guide arm and adapted to resist shifting movement thereof, and stop means disposed to limit the shifting movement of said guide arm to a predetermined extent.

15. In a radial arm shaping device comprising a cutter arm having a free end carrying a rotatable cutter, said cutter being disposed on an axis normal to the longitudinal axis of the cutter arm, means to rotate said cutter, and means to bring said cutter and the work to be shaped into operative engagement with each other, a guide arm pivotally mounted on said cutter arm and having a free end extending parallel therewith across the end of said cutter, a guide member mounted adjacent the free end of said guide arm and disposed to engage a pattern positioned below the work, said guide member being adapted to engage the pattern in advance of engagement of the cutter with the work whereby the guide arm will shift pivotally relative to said cutter arm as the cutter and the work are brought together, means to brake the relative shifting movement of said guide arm, and means to limit the said shifting of said guide arm to a predetermined extent.

16. In a radial arm shaping device comprising a cutter arm having a free end carrying a rotatable cutter, said cutter being disposed on an axis normal to the longitudinal axis of the cutter arm, means to rotate said cutter, and means to bring said cutter and the work to be shaped into operative engagement with each other, a guide arm pivotally mounted on said cutter arm and having a free end extending parallel therewith across the end of said cutter, a guide member mounted adjacent the free end of said guide arm and disposed to engage a pattern positioned below the work, said guide member being adapted to engage the pattern in advance of engagement of the cutter with the work whereby the guide arm is caused to shift pivotally relative to the cutter arm as the cutter and the work are brought together, coacting friction brake means mounted on said cutter arm and said guide arm and adapted to resist the relative shifting of said guide arm, and means to limit the said shifting movement of said guide arm.

17. In a radial arm shaping device comprising a cutter arm having a free end carrying a rotatable cutter disposed on an axis normal to the longitudinal axis of said arm, means to rotate said cutter, spaced work holding means located on opposite sides of the cutter, and means to effect alternate engagement of said cutter with work mounted on said spaced work holding means, a guide arm pivotally mounted on said cutter arm and extending substantially parallel therewith across the end of said cutter, a pair of laterally spaced guide members on said guide arm, said guide members being located adjacent said cutter and adapted to engage a pattern disposed below the work on either of said work holding means, and said guide members being disposed to engage the respective pattern in advance of engagement of the cutter with the work whereby the guide arm is caused to shift pivotally relative to the cutter arm, and adjustable stop means disposed to limit the extent of the relative movement of said guide arm in either direction.

18. In a radial arm shaping device comprising a cutter arm having a free end carrying a rotatable cutter disposed on an axis normal to the longitudinal axis of said arm, means to rotate said cutter, spaced work holding means located on opposite sides of the cutter, and means to effect alternate engagement of said cutter with work mounted on said spaced work holding means, a guide arm pivotally mounted on said cutter arm and extending substantially parallel therewith across the end of said cutter, a pair of laterally spaced guide members on said guide arm, said guide members being located adjacent said cutter and adapted to engage a pattern disposed below the work on either of said work holding means, and said guide members being disposed to engage the respective pattern in advance of engagement of the cutter with the work whereby the guide arm is caused to shift pivotally relative to the cutter arm, means adapted to resist the relative shifting movement of said guide arm as said guide members engage the respective pattern, and adjustable stop means disposed to limit the extent of the relative movement of said guide arm in either direction.

19. A shaper comprising a pair of spaced rotatable work tables mounted on vertical axes and having means to drive said tables, a rotatable vertical column mounted medially behind said work tables, a cutter arm mounted at one end on said column and extending forwardly therefrom between the axes of said work tables, said cutter arm having a rotatable cutter disposed adjacent its forward end and adapted to engage work mounted on said work tables upon shifting of said cutter arm toward the axis of a respective table, and means to turn said column on its axis and shift said cutter arm, said means comprising a double acting reciprocal power device having a resilient crank connection with said column, and reactance means for said power device having fixed support independent of said column.

20. A shaper comprising a pair of spaced rotatable work tables mounted on vertical axes and having means to drive said tables, a rotatable vertical column mounted medially behind said work tables, a cutter arm mounted at one end on said column and extending forwardly therefrom between the axes of said work tables, said cutter arm having a rotatable cutter disposed adjacent its forward end and adapted to engage work mounted on said work tables upon shifting of said cutter arm toward the axis of a respective table, and means to turn said column on its axis and shift said cutter arm, said means comprising a resilient arm rigidly mounted on said column and extending radially therefrom, and a double acting reciprocal power device driving connection with the outer end of said resilient arm, said power device being adapted to apply continuous turning force to said resilient arm in either direction.

21. In a radial arm shaping device comprising a cutter arm having one end pivotally mounted and the other end swingable about the pivot axis, said cutter arm having a rotatable cutter adjacent its swingable end and means to drive the cutter, a cutter arm shifting means comprising a resiliently yieldable crank arm having fixed connection with said cutter arm and extending radially from the pivot axis thereof, and a power device connected to the outer end of said crank arm and disposed to act in a direction at right angles to the pivot axis of said cutter arm, said power device being adapted to apply a continuous turning force to said crank arm, and said crank arm being yieldable to momentarily bend upon initial application of the turning force.

22. In a radial arm shaper comprising a cutter arm having one end mounted on a rotatable vertical column and the other end swingable horizontally about the axis of said column, said cutter arm having a rotatable cutter mounted adjacent its swingable end and means to drive the cutter, means to turn said column in either direction on its axis of rotation comprising a resiliently yieldable crank arm rigidly connected to the column and projecting radially therefrom at a location spaced axially from the cutter arm, a double acting reciprocal power device connected to the outer end of said crank arm and disposed to act in a direction at right angles to the axis of rotation of said column, and reactance means for said power device having fixed support independent of said column, said power device being adapted to apply a continuous turning force to said crank arm in either direction, and said crank arm being yieldable intermediate its ends to bend momentarily upon initial application of force by said power device.

WILLEM GROEN.

REFERENCES CITED

The following references are of record in the file of this patent:

UNITED STATES PATENTS

| Number | Name | Date |
| --- | --- | --- |
| 1,083,160 | Villinger | Dec. 30, 1913 |
| 1,427,297 | Johnson | Aug. 29, 1922 |
| 1,606,308 | Lund | Nov. 9, 1926 |
| 1,800,450 | Hill | Apr. 14, 1931 |
| 2,107,578 | Onsrud | Feb. 8, 1938 |